United States Patent
Carlson et al.

(10) Patent No.: US 11,634,233 B2
(45) Date of Patent: Apr. 25, 2023

(54) DISTRIBUTED BATTERY BANK FOR DUCTED-ROTOR AIRCRAFT

(71) Applicant: Textron Innovations Inc., Providence, RI (US)

(72) Inventors: Nicholas Ralph Carlson, Dallas, TX (US); Frank Brad Stamps, Colleyville, TX (US); George Matthew Thompson, Lewisville, TX (US); Jonathan Andrew Knoll, Alvarado, TX (US)

(73) Assignee: Textron Innovations Inc., Providence, RI (US)

( * ) Notice: Subject to any disclaimer, the term of this patent is extended or adjusted under 35 U.S.C. 154(b) by 267 days.

(21) Appl. No.: 16/908,471

(22) Filed: Jun. 22, 2020

(65) Prior Publication Data
US 2021/0394915 A1    Dec. 23, 2021

(51) Int. Cl.
*B64D 31/00* (2006.01)
*B64D 27/24* (2006.01)
*H02J 7/34* (2006.01)
*B64U 50/19* (2023.01)

(52) U.S. Cl.
CPC ............ *B64D 31/00* (2013.01); *B64D 27/24* (2013.01); *H02J 7/34* (2013.01); *B64D 2221/00* (2013.01); *B64U 50/19* (2023.01)

(58) Field of Classification Search
CPC .... B64D 31/00; B64D 27/24; B64D 2221/00; H02J 7/34; B64C 2201/042; B64C 11/001; B64C 29/0033
USPC ............................................................ 244/55
See application file for complete search history.

(56) References Cited

U.S. PATENT DOCUMENTS

| | | | |
|---|---|---|---|
| 10,384,773 B2 * | 8/2019 | Vondrell | H02K 7/1823 |
| 2013/0189098 A1 * | 7/2013 | Covington | B64C 27/51 416/1 |
| 2018/0065739 A1 * | 3/2018 | Vondrell | B64D 27/24 |
| 2021/0253240 A1 * | 8/2021 | Beck | B64D 27/24 |

FOREIGN PATENT DOCUMENTS

| | | | | |
|---|---|---|---|---|
| EP | 2193993 A2 * | 6/2010 | | B64C 27/20 |
| EP | 2551193 A1 * | 1/2013 | | B64C 29/0033 |
| EP | 3581490 A1 * | 12/2019 | | B64C 11/001 |
| FR | 2999150 A1 * | 6/2014 | | B64C 27/22 |
| FR | 3024431 A1 * | 2/2016 | | B64C 27/22 |
| KR | 20030015263 A * | 2/2003 | | |
| WO | WO-2005072233 A2 * | 8/2005 | | B64C 27/12 |
| WO | WO-2016066848 A1 * | 5/2016 | | B64C 29/0016 |

* cited by examiner

*Primary Examiner* — Charles Reid, Jr.
(74) *Attorney, Agent, or Firm* — Shackelford, Bowen, McKinley & Norton, LLP

(57) ABSTRACT

In an embodiment, a duct for a ducted-rotor aircraft includes a hub, the hub including a rotor and one or more motors configured to drive the rotor. The duct also includes a duct ring that defines an opening surrounding at least a portion of the hub. The duct also includes a plurality of stators that extend outward from the hub. The duct also includes at least one battery electrically coupled to the rotor and configured to power the one or more motors.

12 Claims, 3 Drawing Sheets

DISTRIBUTED BATTERY BANK FOR DUCTED-ROTOR AIRCRAFT

BACKGROUND

Technical Field

The present disclosure relates generally to aircraft and more particularly, but not by way of limitation, to a distributed battery bank for ducted-rotor aircraft.

History Of Related Art

Ducted-rotor aircraft have at least one ducted rotor for providing lift and propulsion forces. Each ducted rotor typically has internal structure that supports a motor of the aircraft and an aerodynamic exterior skin.

SUMMARY

In an embodiment, a duct for a ducted-rotor aircraft includes a hub, the hub including a rotor and one or more motors configured to drive the rotor. The duct also includes a duct ring that defines an opening surrounding at least a portion of the hub. The duct also includes a plurality of stators that extend outward from the hub. The duct also includes at least one battery electrically coupled to the rotor and configured to power the one or more motors.

In an embodiment, a distributed battery system in a ducted-rotor aircraft includes a first at least one battery mounted to a first duct of the ducted-rotor aircraft. The first duct may include a first rotor and a first at least one motor that is configured to drive the first rotor, where the first at least one battery is electrically coupled to the first at least one motor and configured to power the first at least one motor. The distributed battery system also includes a second at least one battery mounted to a second duct of the ducted-rotor aircraft. The second duct may include a second rotor and a second at least one motor that is configured to drive the second rotor, where the second at least one battery is electrically coupled to the second at least one motor and configured to power the second at least one motor.

In an embodiment, a method of battery distribution in a ducted-rotor aircraft includes mounting at least one battery to a duct of the ducted-rotor aircraft. The duct may include a hub that includes a rotor and one or more motors that drive the rotor. The method of battery distribution also includes electrically coupling the at least one battery to the one or more motors.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
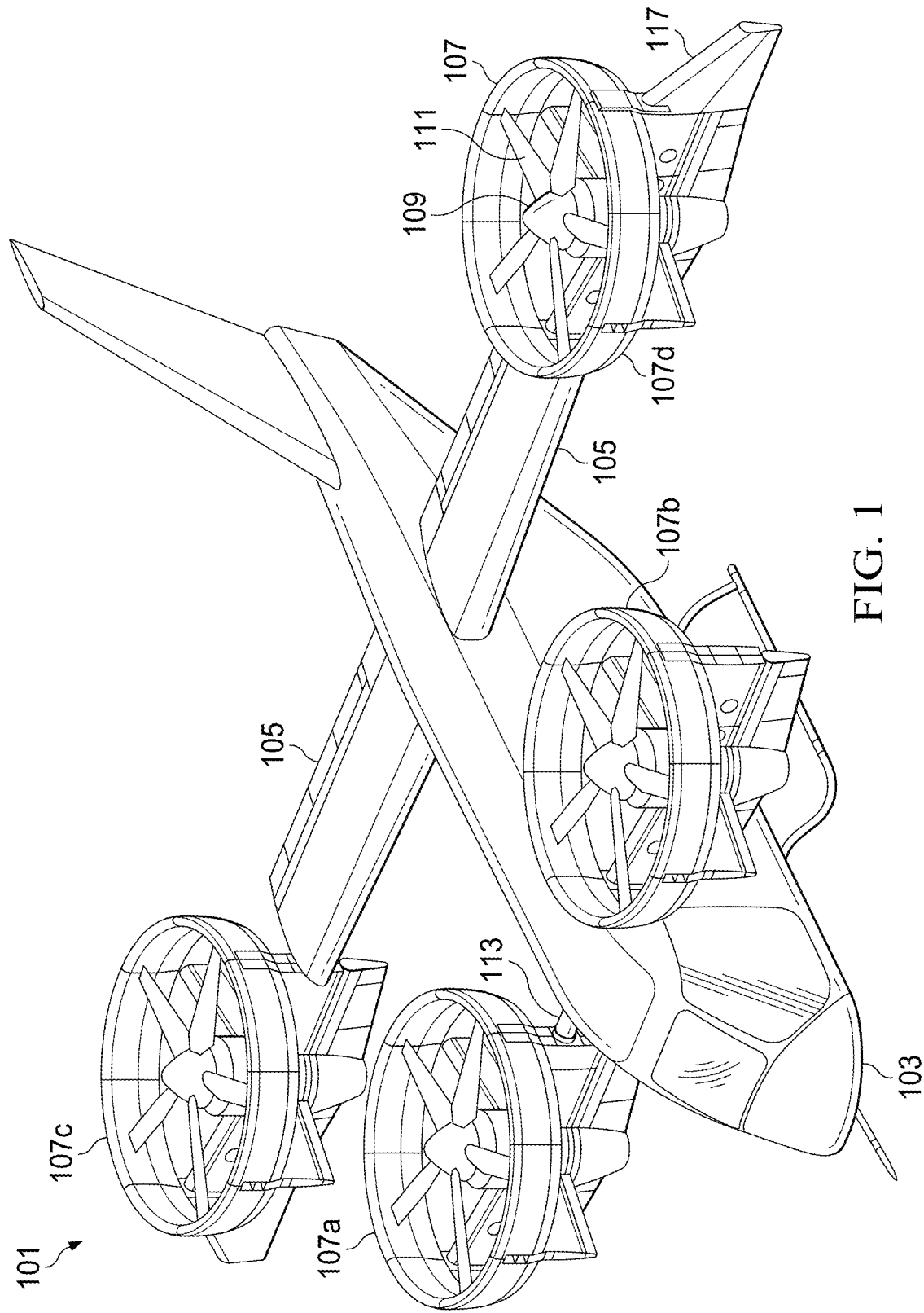
FIG. 1 is an oblique view of an aircraft with ducted rotors, with the ducted rotors configured for the aircraft to operate in helicopter mode.
Figure 2:
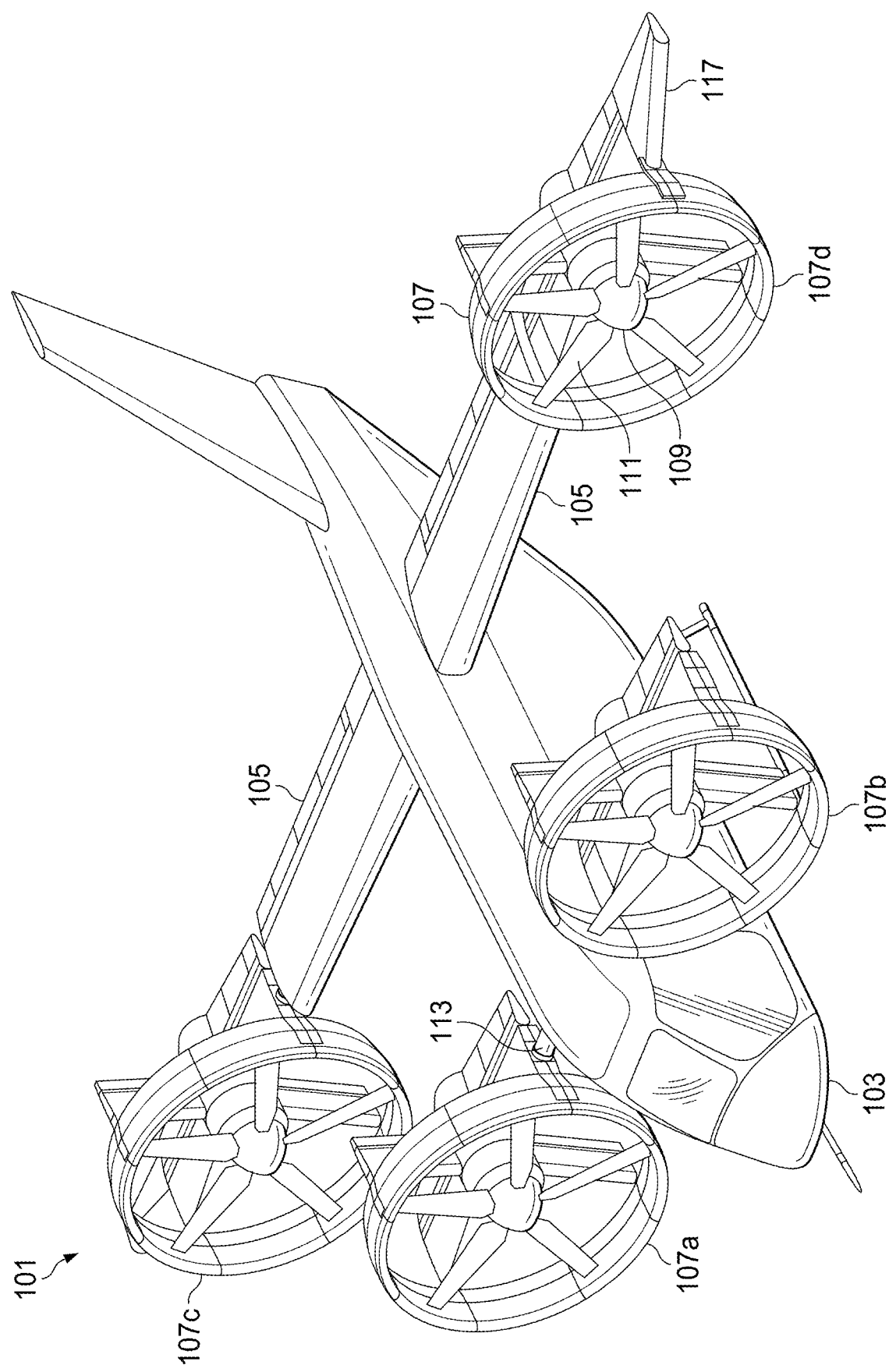
FIG. 2 is an oblique view the aircraft depicted in FIG. 1, with the ducted rotors configured for the aircraft to operate in airplane mode.

FIGS. 1 and 2 are oblique views of a ducted-rotor aircraft 101 that can implement a distributed battery bank. Aircraft 101 comprises a fuselage 103 with a fixed wing 105 that extends therefrom and a plurality of rotatable ducts 107. Each duct 107 houses one or more motors for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

Figure 3:
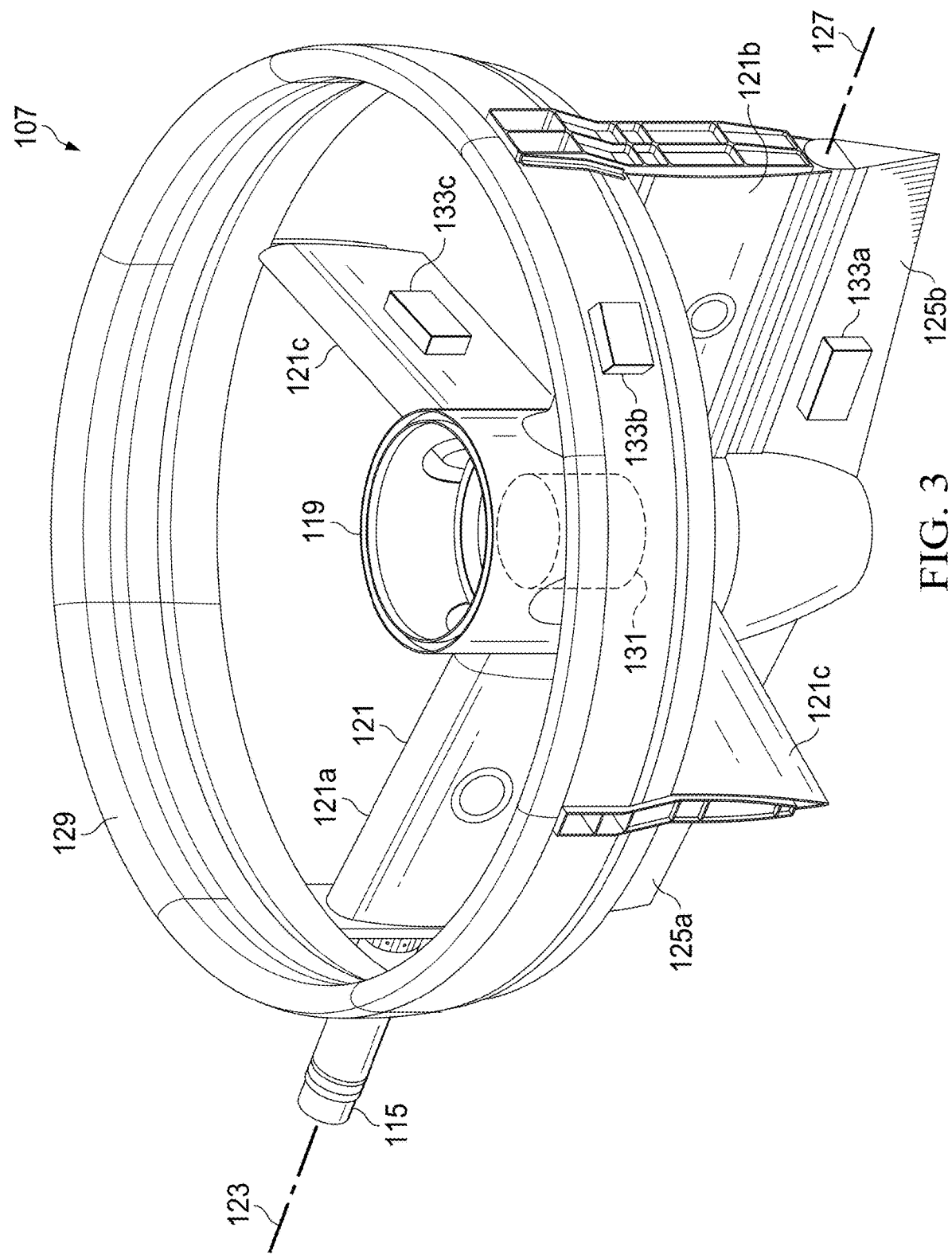
FIG. 3 is an oblique view of a duct of the aircraft depicted in FIG. 1.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 115 (e.g., as seen in FIG. 3). As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

In certain embodiments, batteries are used to power the motors driving the rotors 109. In certain embodiments, rather than consolidating the batteries in a central battery bank located, for example, in the fuselage 103, the batteries can be distributed throughout ducts 107 of aircraft 101, with such batteries constituting a distributed battery bank or system. In particular, each duct 107 can house one or more batteries that are used to power the one or more motors which drive the rotor 109 therein. Examples will be described with respect to FIG. 3.

FIG. 3 is an oblique view of a duct 107 of aircraft 101. For simplicity of illustration, duct 107 is depicted in FIG. 3 without rotor 109. Duct 107 includes a central hub 119 that is configured to support and house a rotor 109, a motor 131 that drives rotor 109 and/or other components. The motor 131 can drive rotor 109 directly or, in some embodiments, indirectly, for example, through a gearbox. For simplicity, motor 131 is illustrated and described singly. However, it should be appreciated that, in various embodiments, motor 131 can be representative of two, three, four, or any other suitable number motors that may be included in the hub 119 for purposes of driving rotor 109. Duct 107 further includes a plurality of stators 121 that extend outwardly from the hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of aircraft 101. It should be appreciated, however, that inboard control vane 125a and outboard control vane 125b may alternatively be configured to rotate independently from one another. It should further be appreciated that duct 107 is not limited to the illustrated configuration of inboard control vane 125a and outboard control vane 125b. For example, duct 107 may alternatively be configured with more or fewer control vanes, such as a single control vane that defines a continuous control surface.

Duct 107 may include a duct ring 129 that surrounds a portion of hub 119 and defines an opening, or passage, through which air moves through duct ring 129. The duct ring 129 can include, for example, one or more sections of skin that form an aerodynamic outer covering of duct 107. As shown, hub 119 is located primarily aft of the opening defined by duct ring 129. Hub 119, stators 121, and control vanes 125a and 125b together comprise a structural portion of duct 107 that supports motor 131 and rotor 109. When ducts 107 of aircraft 101 are positioned as shown in FIG. 2 with blades 111 of rotors 109 rotating, air will move into the duct rings 129 of ducts 107 as rotors 109 generate thrust that causes aircraft 101 to move in a forward direction. As air moves through ducts 107 while blades 111 of rotors 109 are rotating, the air will be exhausted over control vanes 125a and 125b and away from ducts 107, for example in an aft direction as aircraft 101 moves in a forward direction. In this regard, control vanes 125a and 125b are mounted aft of blades 111 of rotors 109.

Duct 107 may include batteries 133a, 133b, and 133c mounted therein that are electrically coupled to motor 131 for purposes of providing power thereto. Motor 131, in turn, drives rotor 109 directly or indirectly as described previously. For illustrative purposes, FIG. 3 shows a battery 133a mounted to outboard control vane 125b, a battery 133b mounted to the duct ring 129, and a battery 133c mounted to a secondary stator 121c. It should be appreciated that, just as motor 131 can be representative of any number of motors, the number of batteries 133a, 133b, and 133c and their respective locations within the duct 107 are solely for purposes of illustration. In some cases, each of the batteries 133a, 133b, and 133c can be electrically coupled to a different motor represented by the motor 131 (e.g., three different motors for the batteries 133a, 133b, and 133c shown in FIG. 3). In various embodiments, batteries 133a, 133b, and 133c can be mounted to any suitable component of the duct 107. For example, batteries 133a, 133b, and 133c may be mounted to any location on or within stators 121, control vanes 125a and 125b, hub 119, and/or duct ring 129. In similar fashion, various implementations can include, in the duct 107, one, two, three, four, or any other suitable number of batteries. Further, in various embodiments, with reference to FIGS. 1 and 2, different ducts 107 may include different numbers of batteries and/or house or mount batteries in different locations.

In certain embodiments, batteries 133a, 133b, and 133c, when distributed across ducts 107 in the fashion described relative to FIGS. 1-3, may be considered a distributed battery bank or system. Various advantages may be realized as a result of using a distributed battery bank or system in the fashion described above instead of a central battery bank. For example, batteries 133a, 133b, and 133c, as a result of being housed in the ducts 107, are significantly closer to a respective motor 131 than they would be if, for example, they were located in a central battery bank in the fuselage 103. Thus, for each duct 107, significantly less wire is typically necessary to electrically couple batteries 133a, 133b, and 133c housed therein to motor 131. Among other advantages, the fact of using less wire may decrease line losses, improve efficiency, and result in considerable weight savings in the aircraft 101.

In another example, an additional advantage of using a distributed battery bank or system in the fashion described above is that batteries 133a, 133b, and 133c are located near a surrounding moving air stream. When batteries such as batteries 133a, 133b, and 133c are located in a central battery bank, for example, in the fuselage 103, heat often poses problems. When batteries 133a, 133b, and 133c are located in ducts 107, the surrounding moving air stream can be used to aid in heat rejection for batteries 133a, 133b, and 133c.

In yet another example, various advantages may be achieved by virtue of excluding batteries similar to batteries 133a, 133b, and 133c from the fuselage 103. In some cases, space in the fuselage that would have been used for a central battery bank can be used for a different purpose. In addition, or alternatively, the fuselage 103 can be made smaller and more efficient given lesser size requirements. Additionally, in many cases, safety can be improved since the weight of batteries 133a, 133b, and 133c will not be in in the vicinity of passengers in the fuselage 103.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A duct for a ducted-rotor aircraft, the duct comprising:
a hub comprising a rotor and an electric motor configured to drive the rotor;
a duct ring that defines an opening surrounding at least a portion of the hub;
a plurality of stators that extend outward from the hub;
a control vane; and
a battery mounted within the duct to one of the control vane, a stator of the plurality of stators, and the duct ring, electrically coupled to the rotor, and configured to power the electric motor.

2. The duct of claim 1, wherein the battery is mounted to the control vane.

3. The duct of claim 1, wherein the battery is mounted to the stator.

4. The duct of claim 1, comprising a second battery and a second electric motor, the second battery configured to power at least one of the electric motor and the second electric motor.

5. The duct of claim 4, comprising:
wherein the control vane is pivotally attached to one or more of the plurality of stators; and
wherein:
the battery is mounted to one of the plurality of stators;
the second battery is mounted to the duct ring; and
a third battery is mounted to the control vane.

6. A distributed battery system in a ducted-rotor aircraft, the distributed battery system comprising:
a first battery mounted to a stator or a control vane of a first duct of the ducted-rotor aircraft, the first duct comprising a first rotor and a first electric motor configured to drive the first rotor;
wherein the first battery is electrically coupled to the first electric motor and configured to power the first electric motor; and
a second battery mounted to a stator or a control vane of a second duct of the ducted-rotor aircraft, the second duct comprising a second rotor and a second electric motor configured to drive the second rotor; and
wherein the second battery is electrically coupled to the second electric motor and configured to power the second electric motor.

7. The distributed battery system of claim 6, comprising a third battery mounted to a stator or a control vane of a third duct of the ducted-rotor aircraft, the third duct comprising a third rotor and a third electric motor configured to drive the third rotor, wherein the third battery is electrically coupled to the third electric motor and configured to power the third electric motor.

8. The distributed battery system of claim 7, comprising a fourth battery mounted to a stator or a control vane of a fourth duct of the ducted-rotor aircraft, the fourth duct comprising a fourth rotor and a fourth electric motor that is configured to drive the fourth rotor, wherein the fourth battery is electrically coupled to the fourth electric motor and configured to power the fourth electric motor.

9. The distributed battery system of claim 8, wherein:
the first battery comprises a first plurality of batteries configured to power the first electric motor;
the second battery comprises a second plurality of batteries configured to power the second electric motor;
the third battery comprises a third plurality of batteries configured to power the third electric motor; and
the fourth battery comprises a fourth plurality of batteries configured to power the fourth electric motor.

10. A method of battery distribution in a ducted-rotor aircraft, the method comprising:
mounting a battery to a stator or a control vane of a duct of the ducted-rotor aircraft, wherein the duct is connected to a hub comprising a rotor and one or more electric motors that drive the rotor; and
electrically coupling the battery to the one or more electric motors.

11. The method of claim 10, wherein:
the mounting comprising mounting a plurality of batteries to the duct; and
the electrically coupling comprises electrically coupling each of the plurality of batteries to at least one of the one or more electric motors.

12. The method of claim 10, comprising:
mounting a second battery to a second duct of the ducted-rotor aircraft, the second duct comprising a second hub that includes a second rotor and a second electric motor that drives the second rotor; and
electrically coupling the second battery to the second electric motor;
mounting a third battery to a third duct of the ducted-rotor aircraft, the third duct comprising a third hub that includes a third rotor and a third electric motor that drive the third rotor;
electrically coupling the third battery to the third electric motor;
mounting a fourth battery to a fourth duct of the ducted-rotor aircraft, the fourth duct comprising a fourth hub that includes a fourth rotor and a fourth electric motor that drive the fourth rotor; and
electrically coupling each of the fourth at least one battery to the fourth one or more electric motors.

* * * * *